June 25, 1963
J. W. HARRISON
3,095,103
CLOSURE FOR CONTAINERS
Original Filed Nov. 25, 1959
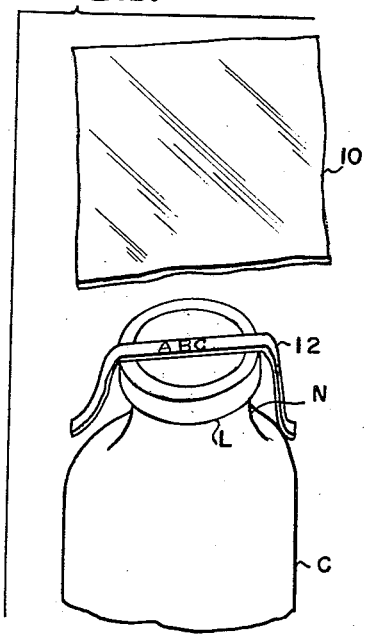
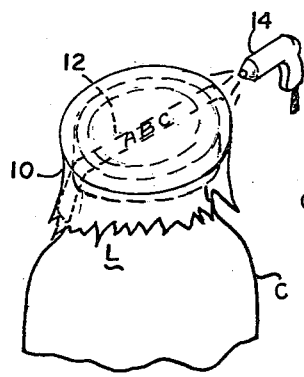
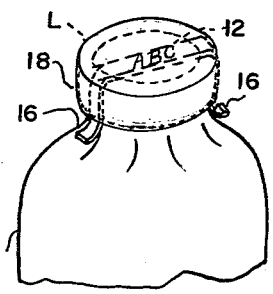
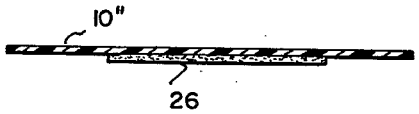
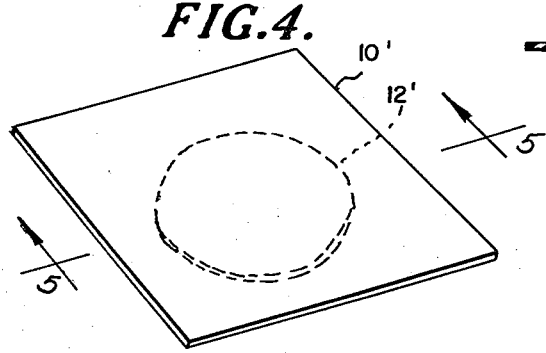
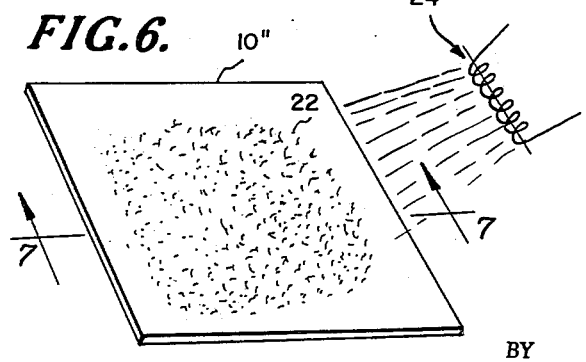
INVENTOR
JOHN W. HARRISON
BY
Cushman, Darby & Cushman
ATTORNEYS United States Patent Office 3,095,103
Patented June 25, 1963

3,095,103
CLOSURE FOR CONTAINERS
John W. Harrison, Winchester, Mass., assignor to W. R. Grace & Co., Cambridge, Mass., a corporation of Connecticut
Original application Nov. 25, 1959, Ser. No. 855,376. Divided and this application Nov. 23, 1960, Ser. No. 80,716
2 Claims. (Cl. 215—38)

The present invention relates to the method of closing containers and to the closure resulting therefrom. More particularly, the method of closing containers of the present invention contemplates the process of utilizing a heat shrinkable film provided with a non-heat shrinkable material between the lip of the container and the film when applied as a closure.

This application is a division of my co-pending application, Serial No. 855,376, filed November 25, 1959, and now abandoned, and is entitled to the filing date thereof.

An object of the present invention is to provide a method of closing a container with a shrunk-on film cover, the method utilizing a non-heat shrinkable material therewith which may be labeled.

Another object of the present invention is to provide a method of closing a container by shrinking on a film of heat shrinkable material, the film being laminated with a layer of non-shrinkable material capable of screening a harmful light from the contents of the container and in some cases providing a further moisture and gas barrier.

A still further object of the present invention is to provide a method for closing a container with a heat shrinkable material and a non-heat shrinkable material, the non-heat shrinkable material being utilized for tearing off the shrunk-on cover.

A further important object of the present invention is to provide a method of utilizing a film of biaxially oriented irradiated polyethylene as a closure for a container, the heat shrinkable polyethylene being laminated with a non-shrinkable material placed next to the container lip.

Still another important object of the present invention is to provide a vacuum-metalized non-shrinkable layer on heat shrinkable film for closing a container, the vacuum-metalized layer being positioned next to the container lip when the closure is formed on the container.

Still a further object of the present invention is to provide a method of closing containers wherein a heat shrinkable film is laminated with a foil of non-heat shrinkable material, the foil being adhesively secured to the heat shrinkable film prior to forming the closure. Ancillary to the preceding object, it is a further object to utilize an adhesive which will soften when the laminated closure is shrunk onto the container lip whereby the heat shrinkable material of the closure may be shrunk without being unduly retarded by the non-heat shrinkable foil.

A still further object of the present invention is to provide a method of closing containers wherein a heat shrinkable film is adhesively secured to a non-heat shrinkable foil, and then the resulting lamination is heat shrunk on a container as a closure, the heat shrinkable material being capable of being removed from the foil with the adhesive staying with the film so that the foil will not be sticky.

These and other objects and advantages of the present invention will appear more fully in the following specification, claims and drawings in which:

FIGURE 1 is an exploded view of the closing of a container such as a bottle in accordance with the method of the present invention;

FIGURE 2 is a fragmentary perspective view of a step in the closing operation of the method of the present invention;

FIGURE 3 is a fragmentary perspective view of a closure applied to the sealing lip of the container;

FIGURE 4 is a perspective view of a modified closure prior to the application of the same to the container;

FIGURE 5 is a view taken on the line 5—5 of FIGURE 4;

FIGURE 6 is a perspective view of a still further modification of the method and showing the application of metal particle to a piece of heat shrinkable film;

FIGURE 7 is a view taken on the line 7—7 of FIGURE 6.

The present invention contemplates a method of closing containers such as bottles, cans or the like having an open mouth with a lip surrounding the same. Broadly, the method comprises utilizing a sheet of heat shrinkable film and applying another layer of non-heat shrinkable material thereto to form a lamination. Then the laminated material is positioned on the lip of the container and heat is applied to the edges of the heat shrinkable layer so that the edges shrink about the lip conforming and tightly holding the non-shrinkable material to the contour of the lip.

In more detail, the heat shrinkable material is laminated to the non-heat shrinkable material by merely placing one layer against the other layer and then positioning the two layers over the open mouth and lip of the container so that the heat shrinking operation can be performed.

On the other hand, an alternate method of making the lamination for use as a closure is to take a layer of non-shrinkable material and adhesively secure it to a layer of heat shrinkable material. A suitable adhesive which has a greater affinity for the heat shrinkable material than the non-heat shrinkable material and which will soften during the application of heat to the laminated material is used. It is necessary for the adhesive to soften when the laminated material is being applied as a closure to to container so that the shrinking of the heat shrinkable film is not retarded by the non-heat shrinkable material. It is further desirable that the adhesive has an affinity for the heat shrinkable material as will be explained in more detail later in the specification. A third means of making the laminated material is by spraying a piece of heat shrinkable film on one side with metal particles and then causing the particles to adhere thereto as a layer by a vacuum process heretofore known in the art.

In each instance of applying the laminated material to the container prior to the application of heat and the shrinking step, the non-heat shrinkable layer is placed next to the lip so that it will be caught and conformed between the lip of the container and the film edge of the heat shrinkable layer as the layer shrinks tightly about the lip.

A preferable heat shrinkable material employed in closing a container in accordance with the present invention and resulting in the novel closure is biaxially oriented irradiated polyethylene having a shrink energy of 250 p.s.i. at 96° C. The biaxially oriented polyethylene was prepared by irradiating Alathon 14 (polyethylene, molecular weight about 20,000, density 0.916).

More generally, the starting polyethylene may be high, low or medium density polyethylene prepared by high or low pressure techniques. The starting polyethylene can have a molecular weight of 7,000 or 12,000 or 19,000 or 21,000 or 24,000 or 35,000 or even higher.

The polyethylene is irradiated to an extent of 2 to 100 megarad, preferably, 6 to 20 megarad. The irradiation can be accomplished in conventional fashion, e.g. by the use of a high voltage resonant transformer, such as the 2,000,000 volt General Electric resonant transformer, or high energy particle generators of 50,000 to 50,000,000 volts, or a Van de Graaff electron generator. In addition to the use of electrons, there can be employed beta rays, gamma rays, e.g. by employing cobalt 60, etc. There can be employed any of the irradiation procedures disclosed in Baird application, Serial No. 713,848, filed February 7, 1958, now Patent No. 3,022,543 or Rainer Patent 2,877,500, for example. The entire disclosure of the Baird application and the Rainer patent is hereby incorporated by reference.

The biaxial orientation is normally carried out to an extent of 100 to 700% longitudinally and 100 to 900% laterally. The biaxially stretching can be carried out by blowing irradiated polyethylene as disclosed in the Baird application. The irradiated biaxially oriented polyethylene has a high shrink energy, that is, 100 to 500 p.s.i. at 96° C.

In place of irradiated polyethylene, there can be employed similarly irradiated polypropylene or polypropylene which has now been irradiated as well as other heat shrinkable films.

Referring now to the drawings, the specific examples of the present invention will hereinafter be described.

In FIGURE 1, a sheet 10 of heat shrinkable biaxially oriented irradiated polyethylene film is placed over the open mouth of a container C having a neck N and a sealing lip L. Interposed between the film 10 and the lip L is a relatively narrow tape or strip 12 made of a non-shrinkable material which is thin, supple and has a greater tear strength than the sheet 10. The strip or tape 12 may be coextensive in length and centered in relation to the film width 10 and secured to the film prior to the placing of the film and tape over the lip L.

As shown in FIGURE 2, when the laminated film 10 and strip 12 are placed over the lip L of the container, the strip 12 lies between the lip L and the sheet 10. The edges of the strip 10 extend downwardly around the neck N of container C. By a suitable heating element 14 (diagrammatically shown), the edges of the sheet 10 are heated to approximately 100° C., which causes the film to shrink about and tightly conform to the lip L. As shown in FIGURE 3, the resulting closure for the container is molded to the container lip with ends 16 of the non-shrinkable tape extending beyond the shrunk film edge 18.

Suitable indicia may be printed on the tape 12 as an identifying means for the container and since the heat shrinkable material is transparent, such indicia may be seen therethrough. Since the tape 12 has a higher tear strength than the film 10, the ends 16 of the tape may be grasped and used to either lift the resulting closure off of the container or to tear the closure.

FIGURES 4 and 5 disclose an alternative laminated sheet for applying to the lip of a container and forming a labeled closure. In more detail, a sheet of heat shrinkable biaxially oriented irradiated polyethylene 10' is provided with a thin membrane of metal foil or other non-shrinkable papers 12'. In this instance, the foil 12' is of sufficient size to completely cover the mouth opening of the container C as well as extend at least part way down the lip L. The foil 12' is first placed onto the container lip with the sheet 10' thereover and as mentioned above with the first described example, the edges of the sheet 10' will then be made to conform to the lip of the container by the application of heat causing them to shrink. When the edges of the sheet 10' shrinks about the lip of the container, they will, in turn, mold the foil to the shape of the lip and tightly hold the foil in place.

The laminated material comprising the sheet 19' and the foil 12' provides a closure with inexpensive labeling means as the foil can be printed with suitable identifying indicia prior to its application on the container. In addition, the foil 12' provides a supplemental moisture and gas barrier as well as a screen to eliminate harmful light from the interior of the container when such a screen is necessary.

The foil 12' may be adhesively secured to the film 10' by use of a suitable adhesive 20 (FIGURE 5) applied to the film 10'. The adhesive 20 is of the type which softens when heated so as to permit the film 10' to shrink without being unduly retarded by the foil. Once the foil 12' and the film 10' have been conformed to the container lip as a closure, and the adhesive again hardens, the adhesive will stay within the film 10' when it is removed from the container so that the foil 12' can remain as a cap upon the container. This is accomplished by using an adhesive which has a greater affinity for the film 10' than the foil.

It will, of course, be understood that the application of the closure disclosed in FIGURES 1 to 3 or a closure made from the laminations shown in FIGURES 4 and 5 as well as that disclosed in FIGURES 6 and 7 may be applied to the container lip by generally molding the closure to the lip in an orifice of the film cover shrinking devices now known in the art. However, the shrinking of the film by the application of heat primarily molds and holds the closure on the container.

FIGURES 6 and 7 disclose a still further form of the present invention. In FIGURE 6, a sheet of heat shrinkable biaxially oriented polyethylene film 10" is shown being metalized on one side with metal particles 22 from any suitable vacuum metallizing apparatus 24. By a vacuum process, the metal particles adhere to the film 10" and provide a shiny layer 26 thereon. In this instance, the laminated material comprising the sheet 10" and the layer 26 of shiny metal particles 22 is placed on the container with the layer 26 against the lip of the container. Layer 26 may be coextensive with 10" or restricted to a smaller area as in FIGURE 7. The layer 26 will entirely cover the open mouth of the container and at least a portion of the lip. Heat can then be applied to the edges of the film 10" and it will shrink about the lip of the container forming the layer 26 to the lip of the container. As heretofore mentioned, the metal particles when they are vacuumized on the film as the layer 26 provides a very shiny surface. When heat is applied, those areas which shrink produce a dull metallic color. In this method the top surface would be shielded from heat, therefore it would remain unshrunk and shiny.

In accomplishing the desired results that are set forth in the objects and advantages of the present invention, and as described in detail in the foregoing description, it will be perceived and obvious that the invention is susceptible to some changes and modifications, both as to the method and resulting article, without departing from the principle and spirit thereof. For this reason, the terminology used in the specification is for the purpose of description and not of limitation, the scope of the invention being defined in the claims.

What is claimed is:

1. In combination, a container having a lip surrounding an opening, and a closure for said container, said closure comprising a layer of heat shrinkable film of a size covering the entire opening and lip of the container, said layer of heat shrinkable film having its edges shrunk about said lip, and a layer of non-heat shrinkable material conformed and held in position at its edges to the lip of the container by the layer of heat shrinkable film, said non-heat shrinkable layer being metal particles vacuum-metalized to the surface of the heat shrinkable film and being shiny across the top of the closure and dull on the edge portion which has been conformed to the lip by the shrunk edges of the film.

2. The combination of claim 1 wherein said heat shrinkable film is biaxially oriented irradiated polyethylene.

References Cited in the file of this patent

UNITED STATES PATENTS

| | | |
|---|---|---|
| 2,079,757 | Berk | May 11, 1937 |
| 2,877,500 | Rainer et al. | Mar. 17, 1959 |

FOREIGN PATENTS

| | | |
|---|---|---|
| 468,762 | Great Britain | July 12, 1937 |